United States Patent [19]

Miyazaki et al.

[11] Patent Number: 4,664,900

[45] Date of Patent: May 12, 1987

[54] ELECTRICALLY CONDUCTIVE COMPOSITIONS

[75] Inventors: Yuji Miyazaki; Akio Nishijima; Kiyomiki Kawanami, all of Omuta, Japan

[73] Assignee: Denki Kagaku Kogyo Kabushiki Kaisha, Tokyo, Japan

[21] Appl. No.: 717,063

[22] Filed: Mar. 28, 1985

[30] Foreign Application Priority Data

| Mar. 29, 1984 | [JP] | Japan | 59-061831 |
| Oct. 9, 1984 | [JP] | Japan | 59-210440 |
| Oct. 18, 1984 | [JP] | Japan | 59-217343 |

[51] Int. Cl.$^4$ .................. H01B 1/04; D01C 5/00
[52] U.S. Cl. .................. 423/447.3; 423/447.6; 423/461; 252/262; 252/510
[58] Field of Search .................. 252/502, 510, 511; 423/447.6, 447.3, 460, 461

[56] References Cited

U.S. PATENT DOCUMENTS

| 3,421,991 | 1/1969 | Hildebrandt | 252/502 |
| 3,427,240 | 2/1969 | Landrum | 252/502 |
| 4,220,846 | 9/1980 | Rice et al. | 252/510 |
| 4,483,840 | 11/1984 | Delhay et al. | 423/445 |
| 4,510,079 | 4/1985 | Kawai et al. | 252/511 |
| 4,521,328 | 6/1985 | Inoue | 423/447.6 |

FOREIGN PATENT DOCUMENTS

| 2066228 | 7/1981 | United Kingdom . |
| 2071072 | 9/1981 | United Kingdom . |
| 2105358 | 3/1983 | United Kingdom . |

Primary Examiner—Josephine L. Barr
Attorney, Agent, or Firm—Shlesinger, Arkwright, Garvey & Fado

[57] ABSTRACT

An electrically conductive composition comprises 100 parts by weight of synthetic resin and/or rubber, 5 to 100 parts by weight of a conductivity-affording agent, and 1 to 100 parts by weight of carbon fiber. The agent used is carbon or acetylene black having resistivity of no higher than 0.3 $\Omega$cm, a hydrochloric acid absorption of 20 to 40 ml/5 g and a specific surface area of 100 to 400 m$^2$/g, which is obtained by continuous thermal cracking of acethlene gas by a mixed gas flow of oxygen-containing gas and steam in the presence or absence of unsaturated hydrocarbons.

14 Claims, No Drawings

ELECTRICALLY CONDUCTIVE COMPOSITIONS

BACKGROUND OF THE INVENTION

The present invention relates to an electrically conductive composition which is mainly composed of synthetic resin and/or rubber, specific carbon black and carbon fibers, and excels in processability, said composition being used for grounding belts for removal of static electricity, antistatic sheets, conductive plastic heater, frame bodies for shielding electromagnetic waves, coaxial cables, conductive films, video discs, conductive paints, etc. The present invention also relates to a conductivity-affording agent to be used with such a composition.

In the prior art, there has been known a method for producing highly conductive compositions by adding powdery carbon or metals to synthetic resin or rubber. However, unless a large amount of commercially available carbon or metal powders is added to the synthetic resin or rubber, then any highly conductive composition to be desired is not obtained. However, the addition of carbon powders in a large amount has the disadvantages that the processability and forming properties drop, and that the resulting formed body is poor in mechanical strength. On the other hand, the addition of metals, such as metal flakes or fibers, in a large amount offers problems that they are powderized or finely cut at the processing stage, the screw, barrel, etc. of the forming machine applied are damaged, etc. There has also been known a composition obtained by adding carbon black and conductive fibers to rubber or synthetic resin. However, that composition is not highly conductive, as expressed in terms of a specific resistance of $2.1 \times 10^2$ to $3.4 \times 10^3$ $\Omega$cm (see Japanese Patent Application Laid-Open-to-Public Nos. 48-11395 and 54-56200).

Referring to a conductivity-affording agent, there have been known, for instance, acetylene black, special conductive furnace black, carbon black such as the by-product obtained in the production of synthetic gases; however, since the conventional agents have insufficient conductivity-affording capability, it is required to use them in a large amount to obtain the necessary conductivity. The addition of such agents also poses the same problems as mentioned above.

Referring specifically to one typical conductivity-affording agent, it is by-product carbon black. This carbon black is a obtained as the by-product, when hydrogen and carbon monoxide gases, the starting materials for synthetic gases are used as are produced by partial combustion of hydrocarbons. This carbon black is obtained from the starting hydrocarbons in an amount of 2 to 3%, and shows high conductivity. However, this carbon black is not used as the conductive black for conductive resin, since impurities present therein remain as foreign matter, damaging largely the appearance of the product.

Another typical conductivity-affording agent is acetylene black as disclosed in Japanese Patent Application Laid-Open-to-Public No. 53-110992. However, this carbon black is also insufficient for use with conductive resin.

SUMMARY OF THE INVENTION

One object of the present invention is to provide a highly conductive composition which is easy to produce and mold, and excels in processability without decreasing the mechanical strength of the product.

Another object of the present invention is to provide a novel conductivity-affording agent which can afford the required conductivity when used in a small amount.

According to one aspect of the present invention, there is provided an electically conductive composition comprising 100 parts by weight of synthetic resin and/or rubber, 5 to 100 parts by weight of highly conductive carbon black having a specific surface area of 100 to 400 m$^2$/g and a hydrochloric acid absorption of 20 to 40 ml/5 g, and 1 to 100 parts by weight of carbon fiber.

According to another aspect of the present invention, there is provided a conductivity-affording agent for resin or rubber, the agent comprising carbon black having an electrical specific resistance of no higher than 1.3 $\Omega$cm according to JIS K 1469, a hydrochloric acid absorption of 20 to 40 ml/5 g according to JIS K 1469 and a specific surface area of 100 to 400 m$^2$/g.

According to a further aspect of the present invention, there is provided acetylene black having an electrical specific resistance of no higher than 0.30 $\Omega$cm at a pressure of 50 kg/cm$^2$, a hydrochloric acid absorption of 20 to 40 ml/5 g and a specific surface area of 100 to 400 m$^2$/g, which acetylene black is obtained by continuous thermal cracking of acetylene gas by a mixed gas flow of an oxygen-containing gas and steam in the presence or absence of unsaturated hydrocarbons.

DETAILED DESCRIPTION OF THE EMBODIMENTS

The synthetic resin and/or rubber (-like material) used in the compositions of the present invention may be commercially available products, and may include, for instance:

(1) thermoplastic resins such as polyethylene, ethylenevinyl acetate copolymers, polypropylene, polystyrene, polyvinyl chloride, polyvinyl acetate, polymethacrylate, acrylonitrile-butadiene-styrene copolymers (ABS), polyphenylene oxide (PPO), modified PPO, polycarbonate, polyacetal, polyamide, etc.

(2) thermosetting resins such as phenol resin, urea resin, melamine resin, epoxy resin, alkyd resin, unsaturated polyester resin, etc.

(3) rubbers such as natural rubber, silcone rubber, polychloroprene rubber, polyisoprene-isobutylene copolymers, styrene-butadiene copolymers, ethylene-propylene base copolymers ethylene-butadiene block copolymers, butadiene-acrylonitrile copolymers, polyurethane, etc.

Reference will now be made to the reasons for limiting the properties of specific resistance, specific surface area and hydrochloric acid absorption of the conductivity-affording agent to the values as mentioned above. When the carbon or acetylene black used as that agent has a specific resistance exceeding 0.3 $\Omega$cm, a hydrochloric acid absorption of less than 20 ml/5 g or a specific surface area of less than 100 m$^2$/g, it cannot afford sufficient conductivity to the resin or rubber when used in a small amount. On the other hand, when that absorption or surface area exceeds 40 ml/g or 400 m$^2$/g, there is a lowering of the processability of the mixture, particularly when preparing resin or rubber compositions.

The amount of the conductivity-affording agent is about 5 to 100 parts by weight per 100 parts of the resin/or rubber. An amount of less than 5 parts by weight causes a drop in the conductivity, while an amount exceeding 100 parts by weight causes a drop of processability.

The conductivity-affording agent may be incorporated into the resin and/or rubber along with various additives, such as known plasticizers, fillers, reinforcing agents, antioxidants, heat-resistant stabilizers, lubricants, fire retardants, cross-linking agents, cross-linking aids, UV absorbers, etc., if required. The resulting formulations may be mixed together by means of dice type mixers, V-type mixers, Henschel mixers, Banbary mixers, Kneaders, continuous type kneaders with a built-in rotor, etc. The resulting mixtures may be molded as such. Alternatively, those mixtures may be gelled by melting, and may then be pelletized. Subsequently, processing may be effected with processing machines, such as direct extruders, injection molding machines, pressing machines, roll molding machines, rotary molding machines, etc.

The carbon fiber used in the composition of the present invention may be commercially available. For example, use may be made of carbon fibers obtained by forming polyacrylonitrile or pitches into fibers, which are in turn made infusible and are calcined, or those obtained by thermal decomposition of hydrocarbon, followed by gas-phase growth. Such carbons may be used alone or in combination.

The amount of carbon fiber is 1 to 100 parts by weight, preferably 15 to 40 parts by weight per 100 parts by weight of polymer. An amount of less than 1 part by weight involves difficulty in improving the mechanical strength of the composition, whereas an amount exceeding 100 parts by weight causes a lower of processability.

According to a third aspect of the present invention, it has been found that the acetylene black obtained according to a certain reaction formula is of extremely high performance.

In other words, the supply of oxygen $O_2$ and gaseous water $H_2O$ to acetylene gas results in a reaction following the reaction formula:

$$C_2H_2 + aO_2 + bH_2O = (2-2a-b)c + (2a+b)CO + (b+1)H_2$$

wherein a and b stand for the molar ratios of oxygen and water to acetylene gas, respectively.

Thus, it has been found that thermal cracking of acetylene gas in the presence of oxygen and water vapor yields acetylene black of unexpectedly high performance.

The term "acetylene gas" used herein refers to high-purity gas obtained by the carbide or petrochemical process. Preferably, high-purity oxygen obtained by the Claude process is used as the oxygen-containing gas, but air may be used for that purpose. The term "steam" refers to water vapor obtained by heating high-purity water, which has been ion-exchanged, or prepared by evaporation, into a vaporized form, followed by complete drying so that no liquid water remains.

The presence of water in a wet state gives rise to insufficient mixing of the three ingredients, acetylene gas, oxygen and water. Observation with a transmission type electron microscope of high magnification revealed that the resulting acetylene black consists of uneven particles, rather than uniform particles. To allow acetylene gas to be mixed with unsaturated hydrocarbons in such an amount that self-continuing exothermic cracking is not impeded does not depart from the purpose of the present invention. Such hydrocarbons may include, e.g., ethylene, propylene, butadiene, benzene, naphthalene, anthracene, etc.

More specifically, the unsaturated hydrocarbons should preferably, be added in an amount of less than 40 parts by weight per 100 parts by weight of acetylene gas. The addition of such hydrocarbons in an amount of more than 40 parts by weight is unpreferred, since the desired specific resistance of less than 0.30 Ωcm is not then attained.

The yield of acetylene black is influenced by the amounts of oxygen, etc. and steam to be added to the starting material of acetylene gas with or without unsaturated hydrocarbons being present.

In other words, the yield of acetylene black is defined in terms of:

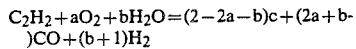

$$\text{Yield of Acetylene Black} = \frac{2 - 2 - a - b}{2} \times 100 \, (\%)$$

(preferably no less than 1%, more preferably no less than 10%).

To this end $0 < a < 1$ and $0 < b < 2$, and $$1 - a \cdot \frac{b}{2} > 0$$

should be

The amount of oxygen-containing gas should, preferably, be 0.01 to less than 1.0 mole per 1 mole of the starting acetylene material, calculated as pure oxygen, and the amount of steam should preferably be 0.01 to less than 2.0 moles.

In the preparation of the acetylene black, the starting acetylene material, oxygen and/or air and water vapor are supplied to a thermal cracking furnace. A vertical-type cracking furnace is provided at the top thereof with an acetylene gas supply nozzle which may be of the double- or triple-tubing type. A mixed gas flow of oxygen and/or air and gaseous water is supplied to the central portion of the double-tubing structure, while the starting acetylene material is fed to the outer annular portion thereof. Alternatively, a mixed gas of oxygen and/or air and gaseous water may be fed to the central and the outermost portion of the triple-tubing structure, while the starting acetylene gas may be supplied to the intermediate annular portion thereof.

The thermal cracking furnace should preferably be maintained at a temperature not lower than 800° C. A temperature lower than 800° C. is unpreferred due to the fact that furnace does not work at that temperature.

Still alternatively, the starting acetylene material, oxygen and/or air and steam may previously be mixed together within the nozzle of the double- or triple-structure structure for supply to the cracking furnace.

In this regard, the starting acetylene material, oxygen-containing gas and steam are subjected to a thermal cracking reaction in the thermal cracking furnace to form acetylene black. A part of the acetylene gas then undergoes combustion and thermal cracking reactions, occurring at the interface of the mixed gas flow of oxygen-containing gas and steam, form highly grown acetylene, while also generating hydrogen and carbon monoxide gases.

The acetylene black discharged from the thermal cracking furnace is cooled in a known manner, and is then separated and cooled from the gas phase in which it is suspended.

According to another feature of a third aspect of the present invention, the acetylene black can effectively be added to the anode formulations of a dry cell to maintain the absorption of electrolyte and afford conductivity to those formulations, thus giving a dry cell performance higher than of the prior art acetylene black.

The aforesaid by-product carbon black shows high conductivity and absorption, but, due to high contents of heavy metal impurities such as iron, nickel, cobalt, vanadium, etc., it is unsuitable for use with a dry cell, since there is then a lowering of storage stability. On the other hand, the acetylene black disclosed in Japanese Patent Application Laid-Open-to-Public No. 53-110972 is also unsuitable for use with a dry cell. This is because of its structure as represented in terms of electrical specific resistance, specific surface area and absorption In what follows, the present invention will be explained in further detail with reference to the following non-restrictive examples.

EXAMPLES 1-5 AND COMPARISON EXAMPLES 1-4

Preparation of Highly Conductive Black

Use was made of a thermal cracking furnace for cracking acetylene gas, the furnace having full length of 2.4 m, an inner diameter of 0.4 m and a discharge port of 0.25 m. A portion of the inner wall of that furnace extending from the top thereof by 0.3 m was constructed as a water cooling jacket, while the remaining portion was formed of a firebrick. A double-tubing nozzle was mounted in the center of the furnace.

15.0 $Nm^3/hr$ of a gas mixture consisting of 10.0 $Nm^3/hr$ of oxygen and 5.0 $Nm^3/hr$ of steam (150° C.), saturated at 4 $kg/cm^2$, were supplied from the center of the double-tubing nozzle, while 18 $Nm^3/hr$ of acetylene gas were fed from the outer annular portion thereof, thereby allowing acetylene gas, oxygen and steam to react with one another. The resulting acetylene black was cooled and collected in a known manner to obtain highly conductive black, the physical properties of which are shown in Table 1, together with those of the by-product black "Ketjen Black"—Trade Name manufactured by Nippon EC.

TABLE 1

|  |  | Example Highly conductive black | Comparison example By-product black |
|---|---|---|---|
| pH |  | 5.1 | 6.9 |
| Specific surface area ($m^2/g$) |  | 300 | 900 |
| Mean particle size (nm) |  | 18 | 30 |
| Hydrochloric acid absorption (ml/5 g) |  | 26 | 30 |
| Ash content (%) |  | <0.01 | 0.7 |
| content of metal impurities having Mohs hardness of no less than 3 | V | <5 | 430 |
|  | Fe | 20 | 100 |
|  | Ni | <1 | 200 |
|  | Mn | <1 | 200 |

TABLE 1-continued

|  |  | Example Highly conductive black | Comparison example By-product black |
|---|---|---|---|
| (ppm) | Cr | <1 | 0.9 |

Note 1:
Measurement of the physical properties shown in Table 1 was carried out according to the following methods.
(1) pH - JIS K-1469
(2) Specific Surface Area - Bet Method
(3) Hydrochloric Acid Absorption - JIS K-1469
(4) Ash content - JIS K-1469
(5) Mean Particle Size - Measured with a transmission electron microscope.
(6) content of Metal Impurities - The metal impurities in carbon black were extracted from hydrochloric acid, evaporated and dried to solids, which were determined in respect of quantities by atomic-absorption spectroscopy.

Preparation of Highly Conductive Compositions

Polymers, highly conductive black and carbon fibers were formulated and kneaded together in the proportions specified in Table 2.

0.5 parts by weight of 2,6-dibutyl-4-methylphenol (BHT) and 0.5 parts by weight of tri(nonylphenol)-phosphite, both acting as antioxidants, and 1.0 part by weight of zinc stearate, serving as a lubricant, were further used per 100 parts by weight of polymer. After the mixture had been kneaded for 8 minutes by means of a Banbary mixer maintained at a temperature of 150° C., the highly conductive black was added thereto, followed by an additional two-minute kneading. The resulting composition was formed into a sheet on an 8-inch roll. The sheet was then pulverized to measure the melt index and volume specific resistance thereof. For the purpose of comparison, the foregoing procedures were repeated in the proportions specified in Table 2, using by-product black in place of the highly conductive black.

The resulting physical properties are set forth in Table 2.

TABLE 2

|  | Examples | | | | | Comparision examples | | | |
|---|---|---|---|---|---|---|---|---|---|
|  | 1 | 2 | 3 | 4 | 5 | 1 | 2 | 3 | 4 |
| Proportion (part by weight) | | | | | | | | | |
| Polymer | | | | | | | | | |
| Polystyrene | 75 | 75 | 75 | 75 |  | 75 | 75 | 75 |  |
| ABS |  |  |  |  | 75 |  |  |  | 75 |
| SB block polymer | 25 | 25 | 25 | 25 | 25 | 25 | 25 | 25 | 25 |
| Carbon black | | | | | | | | | |
| Highly conductive black | 15 | 25 | 35 | 30 | 20 |  |  | 55 |  |
| By-product carbon |  |  |  |  |  | 15 | 10 |  | 15 |
| Carbon Fiber | | | | | | | | | |
| PAN base | 7.5 | 12 | 14 |  | 9 | 10 | 5 |  | 9 |
| Pitch base |  |  |  | 30.0 |  |  |  |  |  |
| Physical properties of composition | | | | | | | | | |
| Volume Resistivity ($\Omega \cdot cm$) | 2.5 | 0.3 | 0.1 | 0.2 | 5 | X | X | 1.0 | X |
| Melt flow index | 2.0 | 0.20 | 0.05 | 0.09 | 0.09 | Not flow | | | |

TABLE 2-continued

|  | Examples | | | | | Comparision examples | | | |
|---|---|---|---|---|---|---|---|---|---|
|  | 1 | 2 | 3 | 4 | 5 | 1 | 2 | 3 | 4 |
| (g/10 minutes) | | | | | | | | | |

Note 1:
The polymer materials shown in Table 2 were as follows:
(1) Polystyrene - "Denka Polystyrene HIS-3" (highly flowable and impact resistance type) - Trade Name - manufactured by Denki Kagaku
(2) ABS - "Denka ABSQH" (highly flowable type) - Trade Name - manufactured by Denki Kagaku Kogyo
(3) SB Block Polymer - "Denka STR 1602" (styrene-butadiene block copolymer rubber) - Trade Name - manufactured by Denki Kagaku
(4) By-Product Carbon - "Ketjen EC" - Trade Name - manufactured by Nippon EC
(5) PAN base Carbon Fiber - "Toreka T-008A-003" (3 mm-long chopped fiber) - Trade Name - manufactured by Toray
Pitch Base Carbon Fiber - "Kureka C-2038" (3 mm-long graphitized and chopped fiber) - Trade Name - manufactured by Kureha Kagaku Kogyo
Note 2:
In Table 2, a mark X shows that kneading was impossible.
Note 3:
Measurement of the physical properties set forth in Table 2 was conducted according to the following methods:
(1) Melt Flow Index - Measured at 200° C. under a load of 5 kg according to JIS K 7210.
(2) Volume Resistivity With the application of heat of 180° C., a sheet was pressed at a pressure of 100 kg/cm into a test piece of 2×2×70 mm, the volume resistivity of which was measured with a digital multimeter (Trade Name: TR-6856 manufactured by Takeda Riken.)

EXAMPLES 6–8 AND COMPARISON EXAMPLES 5–7

The highly conductive black of Examples 1 to 5 was formulated and kneaded in the proportions as specified in Table 3 to obtain conductive compositions.

In Examples 6–7 and Comparison Examples 5–6, kneading was conducted with a Banbary mixer at normal temperature, and sheet-making was done on a roll. This sheet was press-vulcanized at 150° C. for 25 minutes into an 1.5-mm thick sheet.

In Example 8 and Comparison Example 7, kneading was carried out with a Banbary mixer at 180° C., and sheetmaking was done according to Examples 6 and 7 to obtain a 2.0-mm thick sheet.

The physical properties of the resulting sheets are set forth in Table 3.

TABLE 3

|  | Examples | | | Comparison examples | | |
|---|---|---|---|---|---|---|
|  | 6 | 7 | 8 | 5 | 6 | 7 |
| Proportion (part by weight) | | | | | | |
| Chloroprene rubber | 100 | | | 100 | | |
| Styrene-Butadiyne rubber | | 100 | | | 100 | |
| Ethylene-Vinyl Acetate Copolymer | | | 100 | | | 100 |
| Stearic acid | 1 | 1 | | 1 | 1 | |
| Anti-oxidant agent A | 1 | | | 1 | | |
| Anti-oxidant agent B | | 1 | | | 1 | |
| Sulfur | | 1.75 | | | 1.75 | |
| MgO | 4 | | | 4 | | |
| ZnO | 5 | 3 | | 5 | 6 | |
| Vulcanization promotion | 0.5 | | | 0.5 | | |
| Acetylene black | | | | 30 | 30 | 30 |
| Highly conductive black | 25 | 25 | 25 | | | |
| Carbon fiber | 5 | 5 | 5 | | | |
| Properties of the compositions | | | | | | |
| Volume resistivity (Ωcm) | 4.5 | 2.5 | 2.0 | 403 | 914 | 338 |
| Mooney viscosity | 66 | 69 | — | 70 | 66 | |
| ML 1 + 4 (100° C.) | | | | | | |
| Tensile strength (kg/cm²) | 200 | 230 | 115 | 209 | 246 | 122 |
| Elongation (%) | 490 | 650 | 500 | 470 | 650 | 480 |
| Hardness | 64 | 60 | 92 | 70 | 62 | 96 |
| Permanent compression elongation (%) | 28 | 64 | 89 | 27 | 64 | 96 |
| Modulus of resiliency (%) | 42 | 51 | 20 | 42 | 51 | 15 |

Note 1:
The materials set forth in Table 3 were as follows:
(1) Chloroprene Rubber: Denke Chloroprene Rubber M-40 - Trade Name - manufactured by Denki Kagaku Kogyo Co., Ltd.
(2) Styrene-Butadiene Rubber: Nipol 1502 - Trade Name - manufactured by Nippon Zeon Co., Ltd.
(3) Ethylene-Vinyl Acetate Copolymer: NUC-3145 - Trade Name - manufactured by Nippon Unicar Co., Ltd.
(4) Anti-Oxidant Agent A: Nokurakku 224 - Trade Name - manufactured by Ouchi Shinko Co., Ltd.
(5) Anti-Oxidant Agent B: Nokusera-OZ - Trade Name - manufactured by Ouchi Shinko Co., Ltd.
(6) Vulcanization Promotor: Sansera-22 (main ingredient 2-mercaptoimidazoline) - Trade Name - manufactured by Sanshin Kagaku Co., Ltd.
(7) Carbon Fibers: Treka T-008A-003 - Trade Name - manufactured by Toray Co., Ltd.
Note 2:
The physical properties of the compositions shown in Table 3 were measured according to the following methods:
(1) Volume Resistivity: According to JIS K-7210.
(2) Mooney Viscosity: Measured according to JIS K-6300.
(3) Tensile strength, elongation, hardness, permanent compression extension and modulus of resiliency were measured according to JIS K-6301.

The compositions according to a first aspect of the present invention show high electrical conductivity, since they contain the novel black of high conductivity and high purity. In addition, forming yields formed products having clean surfaces. Forming is also easily effected without having any adverse influence upon mechanical properties such as tensile strength.

A second aspect of the present invention will now be explained in further detail with reference to the following non-restrictive examples.

EXAMPLES

Preparation of Conductivity-Affording Agents (Cabon Black)

Use was made of an upright type thermal cracking furnace (having a full length of 2.4 m, an inner diameter of 0.4 m and a discharge port of 0.25 m), including a double-tubing nozzle at the center of the top thereof. Acetylene black (Type I) was prepared by supplying 10 Nm³/hr of a mixed gas (volume ratio of oxygen to saturated water vapor of 150° C.=2:1) from the inner tube and 18 Nm³/hr of acetylene gas from the outer tube. Similarly, acetylene black (Type II) was obtained using 15.4 Nm³/hr of a mixed gas (volume ratio of oxygen to saturated steam of 150° C.=10:5.4). The product has the physical properties shown in Table A.

For the purpose of comparison, Table A also shows the physical properties of commercially available acetylene black ("Denka Black"—Trade Name—manufactured by Denki Kagaku Kogyo Co., Ltd), furnace black ("Valcan XC-72"—Trade Name—manufactured by Cabot Co., Ltd) and by-product carbon black ("Ketjen EC"—Trade Name—manufactured by Nippon EC Co., Ltd).

TABLE A

| Type of carbon black | Invented products Type I | Type II | Comparison products Denka black | Valcan XC-72 | Ketjen EC |
|---|---|---|---|---|---|
| Electrical resistivity ($\Omega \cdot cm$) | 0.18 | 0.21 | 0.25 | 0.30 | 0.20 |
| pH | 5.4 | 5.1 | 7.5 | 7.4 | 6.9 |
| Specific surface area ($m^2/g$) | 250 | 300 | 75 | 225 | 900 |
| Mean particle size (nm) | 18 | 15 | 40 | 27 | 30 |
| Hydrochloric acid absorption (ml/5 g) | 33 | 28 | 14 | 10.5 | 30 |
| Ash content (%) | <0.01 | <0.01 | 0.06 | 0.76 | 0.7 |
| Content of metal impurities having Mohs hardness of no less than 3 (ppm) — V | <0.5 | <5 | <5 | 1 | 430 |
| Fe | 20 | 20 | <8 | 50 | 100 |
| Ni | <1 | <1 | <1 | 7 | 200 |
| Mn | <1 | <1 | <1 | 3 | 200 |
| Cr | <1 | <1 | <1 | 7 | 0.9 |
| Total amount | 20 | 20 | <8 | 70 | 1030 |

It is noted that the electrical specific resistance was measured according to JIS K 1469, and for pH, specific surface area, mean particles size, hydrochloric acid absorption, ash content and content of metal impurities, see Note 1 of Table 1.

Performance Testing of Conductivity-Affording Agents (Carbon Black)

EXAMPLES A, B AND COMPARISON EXAMPLES A-C

Ethylene-vinyl acetate copolymer resin (EVA) ("NUC-3145"—Trade Name—manufactured by Nippon Unicar Co., Ltd.) and carbon black were formulated in the proportions specified in Table B. The resulting formulations were kneaded at 120° C. for 10 minutes by means of a commercially available kneader "Laboplastograph R-60" at 6 r.p.m. The results of the measurement of the volume specific resistance and melt flow index of the kneaded products are shown in Table B.

TABLE B

| Type of testing | Examples A Type I | B Type II | Comparison examples A Denka black | B Valcan XC-72 | C Ketjen EC |
|---|---|---|---|---|---|
| EVA (part by weight) | 100 | 100 | 100 | 100 | 100 |
| Carbon black (part by weight) | 30 | 30 | 30 | 30 | 30 |
| Volume resistivity ($\Omega \cdot cm$) | 8.1 | 7.2 | 70 | 15 | 1.5 |
| Melt flow index (g/10 minutes) | 2.8 | 2.0 | 5.0 | 6.4 | Not flow |

It is noted that melt flow index was measured according to JIS (JAPANESE INDUSTRIAL STANDARD) K 7210, and volume resistivity was done in the following manner:

The obtained kneaded products were pressed at 180° C. for 10 minutes, and were formed into flat test plates of 2 mm in thickness, 70 mm in length and 20 mm in width. A digital multimeter ("TR-6856"—Trade Name—manufactured by Takeda Riken Co., Ltd) was used as the measuring device.

EXAMPLE C AND COMPARISON EXAMPLES D-F

Table C shows the results of using a polypropylene resin ("BJHH-G"—Trade Name—Mitsui Toatsu Co., Ltd.).

TABLE C

| Type of testing | Example C Type II | Comparison examples D Denka black | E Valcan XC-72 | F Ketjen EC |
|---|---|---|---|---|
| Polypropylene resin (part by weight) | 100 | 100 | 100 | 100 |
| Carbon black (part by weight) | 30 | 30 | 30 | 15 |
| Volume resistivity ($\Omega \cdot cm$) | 6.0 | 17.1 | 9.0 | 5.3 |
| Melt flow index (g/10 minutes) | 1.1 | 2.6 | 0.7 | 0.8 |
| Rockwell hardness (R-scale) | 46.5 | 49.8 | 51.6 | 56.4 |
| Izod impact value (kg · cm/cm) | 7.0 | 5.4 | 3.6 | 1.1 |
| Vicat softening point (°C.) | 156.6 | 156.6 | 155.3 | 156.3 |
| Breaking strength (kg/mm²) | 2.80 | 3.12 | 3.28 | 3.61 |
| Elongation (%) | 9.4 | 8.3 | 8.0 | 4.9 |

MEASURING METHODS

Volume Resistivity

The obtained kneaded products were pelletized, and were formed into flat test plates of 2 mm in thickness, 70 mm in length and 20 mm in which by means of an injection molding machine (V-15-75 type automatic injection molding machine of the screw type manufactured by Nippon Seikosho). A digital multimeter ("TR-6856"—Trade Name—manufactured by Takeda Riken Co., Ltd.) was used as the measuring device.

Melt Flow Index: JIS K 7210 (measured at 230 C. under a load of 2.1 kg/cm)
Rockwell Hardness: JIS K 7202
Izod Impact Vaule: JIS K 7110
Vicat Softening Point: JIS K 7206
Breaking Strength and Elongation: JIS K 7113

EXAMPLE D AND COMPARISON EXAMPLES G-I

Table D shows the results of using a styrene base resin. 2.6-dibutyl-4-methylphenol (BHT) and tri(nonylphenyl)phosphite TNP) were added as antioxidants, each in an amount of 0.5 parts by weight, and 1.0 part by weight of zinc stearate was used as a lubricant.

It is noted that the styrene base remains A and B, both manufactured by Denki Kagaku Kogyo Co., Ltd., are highly flowable and impact resistant, as are the styrene resin "HIS-3" (Trade Name) and styrene-butadiene block polymer "STR-1602" (Trade Name), respectively.

TABLE D

| Type of testing | Example D Type II | Comparison examples G Denka black | H Valcan XC-72 | I Ketjen EC |
|---|---|---|---|---|
| Polystyrene A | 85 | 85 | 85 | 85 |
| B | 15 | 15 | 15 | 15 |

TABLE D-continued

|  | Example D | Comparison examples | | |
|---|---|---|---|---|
|  |  | G | H | I |
|  | Type | Type | | |
| Type of testing | Type II | Denka black | Valcan XC-72 | Ketjen EC |
| Carbon black (part by weight) | 30 | 30 | 30 | 15 |
| Volume resistivity (Ω·cm) | 13.0 | 33.4 | 27.4 | 12.4 |
| Melt flow index (g/10 minutes) | 1.0 | 0.35 | 0.37 | 0.12 |
| Rockwell hardness (R-scale) | 100 | 99 | 99 | 107 |
| Izod impact value (kg·cm/cm) | 3.5 | 3.5 | 3.4 | 1.1 |
| Breaking strength (kg/mm$^2$) | 2.40 | 2.48 | 2.47 | 2.79 |
| Elongation (%) | 4.0 | 2.8 | 2.8 | 1.0 |

EXAMPLE E AND COMPARISON EXAMPLE J-K

Table E shows the results of using chloroprene rubber ("Denka Chloroprane Rubber M-40"—Trade Name "Denki Kagaku Kogyo Co., Ltd). It is noted that the anti-oxidant agent used is "Nokusera-CZ"—Trade Name—manufactured by Ouchi Shinko Co., Ltd., and the vulcanization promotor used is "Sansera-22"—Trade Name—manufactured by Sanshin Kagaku Co., Ltd.

TABLE E

|  | Example E | Comparison examples | |
|---|---|---|---|
|  |  | J | K |
|  | Type | Type | |
| Type of testing | Type II | Denka black | Ketjan EC |
| Proportion (part by weight) | | | |
| Chloroprene rubber | 100 | 100 | 100 |
| Stearic acid | 1 | 1 | 1 |
| Anti-oxidant agent | 1 | 1 | 1 |
| MgO | 4 | 4 | 4 |
| ZnO | 5 | 5 | 5 |
| Vulcanization promotion | 0.5 | 0.5 | 0.5 |
| Carbon black | 30 | 30 | 15 |
| Properties | | | |
| Electrical resistivity (Ω·cm) | 22 | 406 | 21 |
| Mooney viscosity ML 1 + 4 (100° C.) | 68 | 70 | 100 |
| Tensile strength (kg/cm$^2$) | 190 | 209 | 241 |
| Elongation (%) | 490 | 470 | 330 |
| Hardness (%) | 65 | 70 | 72 |
| Permanent compression elongation (%) | 25 | 27 | 28 |
| Modulus of resiliency (%) | 44 | 42 | 37 |

MEASURING METHODS

Electrical Resistivity—Standards of Japan Rubber Association, SRIOS 2301-1968

Mooney Viscosity—JIS K 6300

Tensile Strength, Elongation, Hardness, Permanent Compression

Extension and Modulus of Resiliency—JIS K 6301

Due to its increased conductivity-affording ability, the conductivity-affording agent according to the second aspect of the present invention can give the required conductivity to resin or rubber in an amount which is smaller that that required in the art. For that reason, the processability and mechanical properties of the resultant resin or rubber have no substantial adverse influence upon its properties. In addition, the content of impurities having a Mohs hardness of no less than 3 is very small, so that it is possible to manufacture formed articles having clean surfaces.

In what follows, a third aspect of the present invention will be explained in further detail with reference to the following non-restrictive examples.

Referring to the physical properties of the acetylene black according to the third aspect of the present invention, the electrical resistivity and hydrochloric acid absorption were measured according to JIS K-1469.

The specific surface area was measured according to the BET method.

EXAMPLE a

The thermal cracking furnace used was of the upright type, having a full length of 2.4 m, an inner diameter of 0.4 m and a discharge port of 0.25 m in diameter. A portion of the inner wall of the furnace extending from the top thereof by 0.3 m was constructed as a water cooling jacket, while the remaining portion was formed of a firebrick. A double-tubing nozzle was mounted in the center of the furnace. In order to maintain the temperature within the furnace at no less than 800° C., 10 Nm$^3$/hr of carbon monoxide and 60 Nm$^3$/hr of air were supplied and burned. As a result, the temperature reached 850° C. 16.6 Nm$^3$/hr of a mixed gas consisting of 8.3 Nm$^3$/hr of oxygen and 8.3 Nm$^3$/hr of steam saturated, at 4.0 kg/cm$^2$ were, supplied from the center of the nozzle, while 18 Nm$^3$/hr of acetylene gas were fed from the outer annular portion of the nozzle, thereby allowing acetylene gas, oxygen and steam to react with one another. Then, the resulting acetylene black was cooled and collected in the known manner.

The supply rate of acetylene gas to the thermal cracking furnace was linear at 5.9 m/sec, and that of the mixed gas of oxygen and steam was 69.7 m/sec. The molar ratios of both oxygen and steam to acetylene gas were 0.46, while the molar ratio of oxygen to steam was 1.0. The obtained acetylene black showed high performance as expressed in terms of an electrical resistivity of 0.20 Ωcm, a HCl absorption of 24.5 cc/5 grams and a specific surface area of 250 m$^2$/gram. Table a gives the properties of various types of black for the purpose of comparison.

TABLE a

Comparison of the Properties of Various Black

|  | Example 1 | Comparison examples | | |
|---|---|---|---|---|
|  |  | Acetylene black (Denka Black - Trade Name) | Japanese Pat. Appln. Laid-Open-to-Public No. 53-110992 | By-product black |
| Electrical resistivity (Ωcm) | 0.20 | 0.22 | 0.35 | 0.25 |
| HCl absorption (ml/5 g) | 24.5 | 15.5 | 20 | 22 |
| Specific surface area (m$^2$/g) | 250 | 70 | 95 | 600 |

In the table, "acetylene black" refers to "Denka Black"—Trade Name, "Japanese Patent Application Laid-Open-to-Public No. 53-110992" to acetylene black obtained by partial combustion of acetylene gas with air, and "by-product black" refers to carbon black obtained as the by-product of the process of producing a mixed gas of carbon monoxide and hydrogen, say, in the Texaco or Ube process.

The black according to Example a of the present invention excels in electrical resistivity, shows a high HCl absorption, and excels in specific surface area. The black according to Japanese Patent Application Laid-Open-to-Public No. 53-110992 is poor in electrical ressistivity as well as in HCl absorption and specific surface area. The by-product black has a large specific surface area, but does not show high HCl absorption.

EXAMPLES b–o

Example a was repeated with 18 Nm$^3$/hr of acetylene gas and varied flow rates of oxygen and steam. Table b shows the relation of the molar ratios of oxygen and steam to acetylene gas and the molar ratio of oxygen to steam in that case.

TABLE b

| (Example) | Flow ratio | | | Flow ratio | | |
|---|---|---|---|---|---|---|
| | Acetylene gas Nm$^3$/H | Oxygen Nm$^3$/H | Steam Nm$^3$/H | Acetylene gas m/sec | (Mixed gas of oxygen and steam) m/sec | Flow ratio of mixed gas / Acetylene gas |
| c | 18 | 3.6 | 3.6 | 5.9 | 30.3 | 5.9 |
| b | 18 | 5.9 | 5.9 | 5.9 | 45.5 | 7.7 |
| a | + | 8.3 | 8.3 | + | 67.9 | 11.8 |
| d | + | 10.8 | 10.8 | + | 90.9 | 15.4 |
| e | 18 | 4.3 | 2.2 | 5.9 | 27.4 | 4.6 |
| f | + | 7.2 | 3.6 | + | 45.5 | 7.7 |
| g | + | 10.1 | 5.0 | + | 63.5 | 10.8 |
| h | + | 13.0 | 6.5 | + | 82.1 | 13.9 |
| i | 18 | 6.5 | 1.6 | 5.9 | 34.1 | 5.8 |
| j | + | 9.7 | 2.3 | + | 50.5 | 8.6 |
| k | + | 13.0 | 3.2 | + | 68.2 | 11.6 |
| l | 18 | 1.1 | 8.6 | 5.9 | 40.8 | 6.9 |
| m | + | 1.8 | 14.4 | + | 68.2 | 11.6 |
| n | + | 3.2 | 25.9 | + | 122.5 | 20.8 |

| (Example) | Molar ratio | | | Yield % | Properties | | |
|---|---|---|---|---|---|---|---|
| | a Oxygen / Acetylene gas | b Steam / Acetylene gas | Steam Oxygen b/a | | Electrical resistivity Ωcm | Hydrochloric acid absorption cc/5 g | Specific surface area |
| c | 0.2 | 0.2 | 1.0 | 70 | 0.23 | 22.0 | 150 |
| b | 0.33 | 0.33 | + | 50 | 0.22 | 24.0 | 200 |
| a | 0.46 | 0.46 | + | 30 | 0.20 | 24.5 | 250 |
| d | 0.60 | 0.60 | + | 10 | 0.20 | 26.2 | 200 |
| e | 0.24 | 0.12 | 0.5 | 70 | 0.23 | 22.0 | 160 |
| f | 0.40 | 0.20 | + | 50 | 0.22 | 24.3 | 220 |
| g | 0.56 | 0.28 | + | 30 | 0.21 | 26.3 | 280 |
| h | 0.72 | 0.36 | + | 10 | 0.21 | 28.1 | 250 |
| i | 0.36 | 0.09 | 0.25 | 60 | 0.20 | 33.1 | 200 |
| j | 0.54 | 0.13 | + | 40 | 0.18 | 35.3 | 250 |
| k | 0.72 | 0.18 | + | 20 | 0.15 | 35.5 | 350 |
| l | 0.06 | 0.48 | 8.0 | 70 | 0.24 | 21.2 | 120 |
| m | 0.10 | 0.80 | + | 50 | 0.24 | 22.5 | 160 |
| n | 0.18 | 1.44 | + | 10 | 0.24 | 23.3 | 130 |

All the acetylene black obtained had an improved electrical specific resistance, an excellent hydrochloric acid absorption and a high specific surface area.

COMPARISON EXAMPLES a–f

In these examples, a flow rate of 18 Nm$^3$/hr of acetylene gas was applied to the same thermal cracking furnace as used in Example a to clarify what was brought about in the absence of both or either one of oxygen and steam.

Table c shows the comparison of the conditions and properties.

TABLE c

| (Comparison example) | Flow ratio | | | Flow ratio | | |
|---|---|---|---|---|---|---|
| | Acetylene gas Nm$^3$/H | Oxygen Nm$^3$/H | Steam Nm$^3$/H | Acetylene gas m/sec | (Mixed gas of oxygen and steam) m/sec | Flow ratio of mixed gas / Acetylene gas |
| a | 18 | 0 | 0 | 5.9 | 0 | 0 |
| b | + | 7.2 | 0 | + | 30.3 | 5.1 |
| c | + | 14.4 | 0 | + | 60.6 | 10.1 |
| d | 18 | 0 | 7.2 | + | 30.3 | 5.1 |
| e | + | 0 | 18 | + | 75.6 | 12.8 |
| f | + | 0 | 32.4 | + | 136.4 | 23.1 |

| (Comparison example) | Molar ratio | | | Yield % | Properties | | |
|---|---|---|---|---|---|---|---|
| | a Oxygen / Acetylene gas | b Steam / Acetylene gas | Steam Oxygen b/a | | Electrical resistivity Ωcm | Hydrochloric acid absorption cc/5 g | Specific surface area m$^2$/g |
| a | 0 | 0 | 0 | 100 | 0.25 | 15.0 | 70 |
| b | 0.4 | 0 | 0 | 60 | 0.30 | 12 | 60 |
| c | 0.8 | 0 | 0 | 20 | 0.40 | 10 | 60 |

TABLE c-continued

| d | 0 | 0.4 | — | 80 | 0.40 | 14 | 70 |
| e | 0 | 1.0 | — | 50 | 0.60 | 13 | 70 |
| f | 0 | 1.8 | — | 10 | 0.30 | 17 | 90 |

As will be understood, no high-performance acetylene black was obtained, when either one of oxygen and steam was supplied.

EXAMPLES o-t AND COMPARISON EXAMPLES g-h

The same thermal cracking furnace as in Example a was used.

In Example o-g, ethylene gas was used as the unsaturated hydrocarbon. More specifically, ethylene gas was allowed to coexist per 100 parts of acetylene gas in amounts of 10 and 20 parts (1.7 and 3.3 Nm³/hr per 18 Nm³/hr of acetylene gas), and 40 parts (5.7 Nm³/hr per 15 Nm³/hr of acetylene gas).

In Examples r-t, gaseous benzene was used as the unsaturated hydrocarbon. The amounts of benzene used were 10 and 20 parts (0.6 and 1.2 Nm³/hr per 18 Nm³/hr of acetylene gas), and 40 parts (2.0 Nm³/hr per 15 Nm³/hr of acetylene gas).

In Comparison Examples g and h, ethylene and benzene gases were allowed to exist with acetylene gas, both in amounts of 50 parts (7.0 Nm³/hr of ethylene gas and 2.5 Nm³/hr of benzene gas per 15 Nm³/hr of acetylene gas).

The unsaturated gases were supplied into the outer annular portion of the double-tubing nozzle in the form of a mixture with acetylene gas.

The results are shown in Table d.

TABLE d

| | Flow ratio Outer annular portion of double-tubing nozzle | | | Flow ratio Central portion of double-tubing nozzle | | Flow ratio Outer annular portion m/sec | Flow ratio Central portion m/sec | Flow ratio (central portion)/(Outer annular portion) |
|---|---|---|---|---|---|---|---|---|
| | Acetylene gas Nm³/H | Ethylene gas Nm³/H | Benzene gas Nm³/H | Oxygen Nm³/H | Steam Nm³/H | | | |
| (Example) | | | | | | | | |
| j | 18 | — | — | 9.7 | 2.3 | 5.9 | 50.5 | 8.6 |
| o | + | 1.7 | — | + | + | 6.5 | + | 7.8 |
| p | + | 3.3 | — | + | + | 7.0 | + | 7.2 |
| q | 18 | 5.7 | — | + | + | 6.8 | + | 7.4 |
| r | 18 | — | 0.6 | + | + | 6.1 | + | 8.3 |
| s | + | — | 1.2 | + | + | 6.3 | + | 8.0 |
| t | 15 | — | 2.0 | + | + | 5.6 | + | 9.0 |
| (Comparison example) | | | | | | | | |
| g | 15 | 7.0 | — | + | + | 7.2 | + | 7.0 |
| h | + | — | 2.5 | + | + | 5.7 | + | 8.9 |

| | Molar ratio | | | | Properties | | |
|---|---|---|---|---|---|---|---|
| | a Oxygen / Acetylene gas | b Steam / Acetylene gas | Steam Oxygen b/a | Yield % | Electrical resistivity Ωcm | Hydrochloric acid absorption cc/5 g | Specific surface area m²/g |
| (Example) | | | | | | | |
| j | 0.54 | 0.13 | 0.25 | 40 | 0.18 | 35.3 | 250 |
| o | 0.49 | 0.12 | 0.25 | 45 | 0.20 | 30.6 | 210 |
| p | 0.46 | 0.11 | 0.25 | 49 | 0.23 | 25.0 | 160 |
| q | 0.47 | 0.11 | 0.25 | 48 | 0.29 | 21.0 | 120 |
| r | 0.52 | 0.12 | 0.25 | 45 | 0.20 | 33.6 | 240 |
| s | 0.51 | 0.12 | 0.25 | 49 | 0.22 | 27.3 | 200 |
| t | 0.57 | 0.14 | 0.25 | 48 | 0.24 | 24.6 | 150 |
| (Comparison example) | | | | | | | |
| g | 0.44 | 0.10 | 0.25 | 52 | 0.35 | 18 | 90 |
| h | 0.55 | 0.13 | 0.25 | 52 | 0.27 | 19 | 95 |

From Examples o-t, it is found that, even when unsaturated hydrocarbons such as ethylene and benzene gases coexist in amounts of up to 40 parts, high-performance acetylene black can be obtained.

In an amount of as high as 50 parts, however, the temperature within the furnace becomes so low that no acetylene black having the desired physical properties is obtained, since the heat of decomposition of the unsaturated hydrocarbons is smaller than that of the acetylene gas.

EXAMPLES u-x

A flow rate of 12 Nm³/hr of acetylene gas was applied to the same thermal cracking furnace of Example a to clarify an effect obtained when pure oxygen and air (21% oxygen and 99% nitrogen) were used as the oxygen source.

TABLE e

| Flow ratio Outer annular portion of double-tubing nozzle | Flow ratio Central portion of double-tubing nozzle | Flow ratio Outer annular | Flow ratio Central | Flow ratio |

TABLE e-continued

|   | Acetylene gas Nm³/H | Oxygen Nm³/H | Air Nm³/H | Steam Nm³/H | portion m/sec | portion m/sec | (Central portion) (Outer annular portion) |
|---|---|---|---|---|---|---|---|
| u | 12 | 2.4 | 0 | 2.4 | 3.9 | 20.5 | 5.2 |
| v | 12 | 0 | 12.0 | 2.4 | + | 60.6 | 15.5 |
| w | 12 | 0.7 | 0 | 5.8 | 3.9 | 27.4 | 7.0 |
| x | 12 | 0 | 3.3 | 5.8 | + | 38.3 | 9.8 |

|   | Molar ratio | | | | Properties | | |
|---|---|---|---|---|---|---|---|
|   | a Oxygen Acetylene gas | b Steam Acetylene gas | Steam Oxygen b/a | Yield % | Electrical resistivity $\Omega$cm | Hydrochloric acid absorption cc/5 g | Specific surface area m²/g |
| u | 0.25 | 0.25 | 1.0 | 63 | 0.23 | 22.0 | 140 |
| v | 0.25 | 0.25 | 1.0 | 63 | 0.24 | 21.0 | 130 |
| w | 0.06 | 0.48 | 8.0 | 70 | 0.24 | 21.0 | 120 |
| x | 0.06 | 0.48 | 8.0 | 70 | 0.25 | 20.0 | 110 |

According to the third aspect of the present invention, it has been found that high-quality acetylene black can be obtained by thermal cracking acetylene gas with a mixed gas flow of oxygen and steam. When oxygen alone is used, no improvements are achieved. On the other hand, the use of steam alone does not yield high-quality acetylene black due to a drop in the temperature within the furnace. In addition, it has been found that the coexistence of ethylene or benzene gas also yields high-performance acetylene black.

What is claimed is:

1. Acetylene black having an electrical resistivity of no higher than 0.03 $\Omega$cm at a pressure of 50 kg/cm², a hydrochloric acid absorption of 20 to 40 ml/5 g and a specific surface area of 100 to 400 m²/g, which is obtained by continuous thermal cracking at a temperature of no less than 800° C. of acetylene gas by a mixed gas flow of oxygen-containing gas and dry steam, said oxygen-containing gas having the relation a +(b/2)<1 in molar units, where 0<a<1 and 0<b<2 with respect to steam b as pure oxygen a.

2. Acetylene black as claimed in claim 1, wherein:
 (a) said thermal cracking occurring in the presence of an unsaturated hydrocarbon.

3. Acetylene black as claimed in claim 2, in which the amount of said unsaturated hydrocarbons is no less than 40 parts by weight per 100 parts by weight of acetylene gas.

4. Acetylene black as claimed in claim 2, in which said unsaturated hydrocarbon is at least one of ethylene, propylene, butadiene, benzene, naphthalene and anthracene.

5. Acetylene black as claimed in claim 1, in which said oxygen-containing gas is pure oxygen and/or air.

6. Acetylene black as claimed in claim 1, in which said steam is completely dried and obtained from wather purified by ion exchange.

7. Acetylene black is claimed in claim 2, wherein:
 (a) the amount of said unsaturated hydrocarbon is no less than 40 parts by weight per 100 parts by weight of acetylene gas.

8. Acetylene black as claimed in claim 1, wherein:
 (a) said oxygen-containing gas including air.

9. Acetelene black as claimed in claim 1, wherein:
 (a) said steam obtained from water purified by evaporation.

10. The method of preparing an acetylene black having an electrical resistivity of no more than 0.03 $\Omega$cm at a pressure of 50 kg/cm², a hydrochloric acid absorption of 20 to 40 ml/5 g and a specific surface area of 100 to 400 m²/g, comprising the steps of:
 (a) thermally cracking at a temperature of no less than 800° C. acetylene gas with a mixed gas flow of an oxygen-containing gas and dry steam, said oxygen-containing gas having the relation a+(b/2)<1 in molar units where 0<a<1 and 0<b<2 with respect to steam b and pure oxygen a.

11. The method of claim 10, including the further step of:
 (a) providing a mixed gas flow further including an unsaturated hydrocarbon wherein the amount of said unsaturated hydrocarbon is no less than 40 parts by weight per 100 parts by weight of acetylene gas.

12. The method of claim 10, including the step of:
 (a) obtaining said dried steam by ion exchange.

13. The method of claim 11, including the step of:
 (a) providing an unsaturated hydrocarbon selected from the group ethylene, propylene, butadiene, benzene, naphthalene and anthracene.

14. The method of claim 10, including the step of:
 (a) providing an oxygen-containing gas selected from the group of pure oxygen and air.

* * * * *